W. C. TROUT.
EXPANSION SPROCKET.
APPLICATION FILED AUG. 10, 1921.
1,424,327.
Patented Aug. 1, 1922.
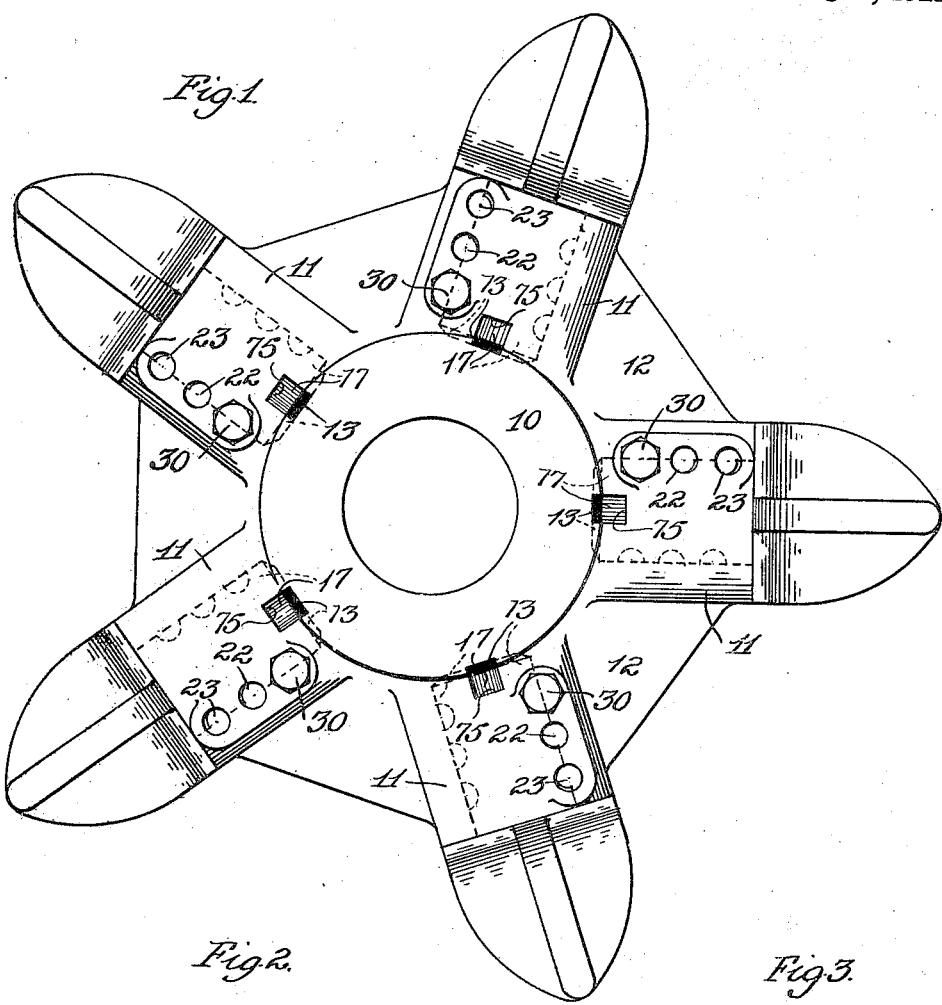
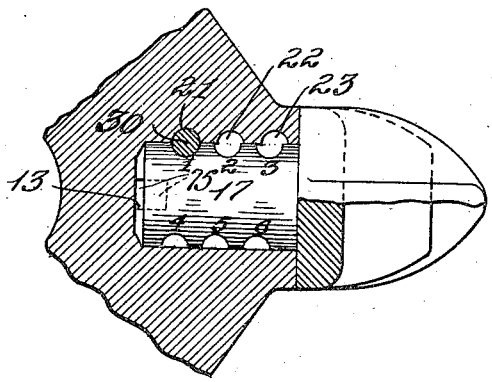
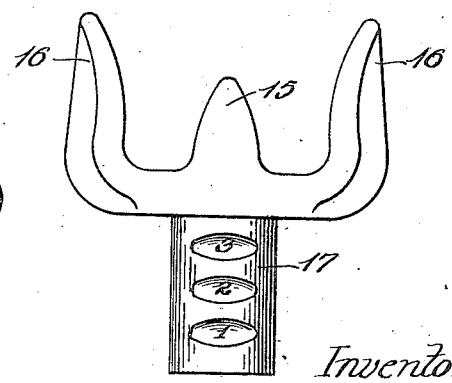
Inventor:
Walter C. Trout,
By Dyrenforth, Lee, Chritton & Wiles
Attys.

UNITED STATES PATENT OFFICE.

WALTER C. TROUT, OF LUFKIN, TEXAS.

EXPANSION SPROCKET.

1,424,327.     Specification of Letters Patent.     Patented Aug. 1, 1922.

Application filed August 10, 1921. Serial No. 491,120.

*To all whom it may concern:*

Be it known that I, WALTER C. TROUT, a citizen of the United States, residing at Lufkin, in the county of Angelina and State of Texas, have invented new and useful Improvements in Expansion Sprockets, of which the following is a specification.

This invention relates to improvements in expansion sprockets and is fully described and explained in this specification and shown in the accompanying drawings, in which—

Figure 1 is a view in side elevation of an expansion sprocket embodying the features of my invention, Fig. 2 is a vertical sectional view taken through one of the teeth of the sprocket, and Fig. 3 is a view in front elevation of one of the teeth removed from the sprocket.

The sprocket shown in this specification is adapted for driving a round linked chain; a link of the chain fitting over each of the center prongs of the teeth. Chains used on such sprockets wear by continued use and become longer; thus requiring a larger sprocket in order to make the links fit the teeth properly. My improved expansion sprocket is so constructed that it may readily be increased in size to compensate for such wear on the chain. It is obvious also that the size may be changed in order to accommodate it to different chains, or for any other purpose. Although I have shown a sprocket adapted for use with a round linked chain, it is obvious that, without detracting from the spirit of my invention, features thereof may be embodied in a sprocket adapted for use with any other kind of chain; or, in fact, in any kind of sprocket where, for any reason at all, it is necessary or desirable to make the teeth adjustable, or the sprocket expansible.

As shown in the drawings, 10 indicates a cast hub with five radial cylindrical projections 11 joined by reinforcing webs 12. Each of the projections 11 is provided with a cored or drilled cylindrical radial hole 13 adapted to adjustably contain the shank of a tooth as will be explained more in detail hereinafter.

Since the construction and manner of adjustment of each of the teeth is the same, I will describe in detail but one. In Fig. 3 I have shown a tooth removed from the sprocket. It will be noted that the tooth comprises a chain-engaging part consisting of a center prong 15 and two side guiding prongs 16. In operation, the center prong 15 engages with a link of the chain and drives the same. Formed at the bottom of the chain-engaging part is a cylindrical shank 17 adapted to fit into the hole 13. Through each of the parts 11 are drilled three holes 21, 22 and 23. These holes are to one side of the center, as shown in the drawings, and lie parallel to the main axis of the sprocket. They are so placed that they will break into the sides of the holes 13. The shank 17 of the tooth is provided on each of two opposite sides with three circular notches, adapted to register with the holes 21, 22 and 23, when the tooth is in different positions. The placing of these notches on the shank is most clearly shown in Fig. 2, from which it will be noted that when the tooth is farthest in, notch 1 will register with hole 21, when the tooth is pulled out $\tfrac{1}{16}$ of an inch notch 2 will register with hole 22 and when the tooth is pulled out $\tfrac{1}{8}$ of an inch notch 3 will register with hole 23. When in this position the tooth will be extended $\tfrac{1}{8}$ of an inch. If it is desired to extend the tooth $\tfrac{3}{16}$ of an inch, it is pulled out $\tfrac{1}{16}$ of an inch farther and turned half-way around when notch 4 will register with hole 21. Likewise the tooth may be extended $\tfrac{1}{16}$ of an inch farther, or $\tfrac{1}{4}$ of an inch in all when notch 5 will register with hole 22. An additional extension of $\tfrac{1}{16}$ of an inch or $\tfrac{5}{16}$ of an inch in all will bring notch 6 even with hole 23. The tooth is held in any of its various adjustments by placing a bolt 30 through the proper hole which has a notch registering with it. In Fig. 1, all of the teeth are in their innermost positions and the bolts 30 are in the holes 21 and engaging with the notches 1.

Although I have shown a certain arrangement and spacing of the holes and notches, it is obvious that, without detracting from the spirit of my invention, these may be placed and arranged in a great variety of ways. It is obvious also that by different arrangements of the notches and holes more than one bolt may be used, if desired.

Each of the parts 11 is also provided with a square hole 75 entering the bottom of the hole 13 and extending entirely through the part 11. The holes 75 are for the purpose of accommodating a chisel or other wedgeshaped instrument which can be driven in under the shank 17 of a tooth in order to assist in raising the same.

While I have shown and described certain embodiments of my invention it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. An expansion sprocket comprising a hub with radially arranged sockets, a plurality of teeth each having a shank adapted to fit into such sockets, a plurality of holes drilled transversely through each of such sockets, and notches on the shank of the tooth adapted to successively register with such holes as the shank is moved inwardly and outwardly in the socket.

2. An expansion sprocket comprising a hub with radially arranged sockets, a plurality of teeth having shanks adapted to fit into said sockets, a hole drilled transversely through each of said sockets, and a plurality of notches on each shank of said teeth, said notches adapted to register with said hole as the shank is moved inwardly and outwardly in the socket.

3. An expansion sprocket comprising a hub with radially arranged sockets, a plurality of teeth having shanks adapted to fit into said sockets, and means for adjustably holding said shanks in said sockets, said means comprising a bolt held in the hub part and engaging one of a series of notches in the shank of the tooth.

4. An expansion sprocket comprising a hub with radially arranged sockets, a plurality of teeth having parts adapted to fit into said sockets, and means for adjustably holding said parts in said sockets, said means comprising a member held in the hub part and engaging one of a series of notches in the part of the tooth which is in the socket.

5. An expansion sprocket comprising a hub, radially arranged sockets in said hub each having a plurality of transverse recesses in the walls thereof of a depth of a portion of the diameter of a securing device to be received therein, a plurality of teeth each having a shank portion adapted to fit in said sockets and provided with notches of a depth complementing that of the recesses in the walls thereof and located to register therewith as the shank is moved inwardly and outwardly therein, and a securing member seating in the openings formed by said recesses and notches.

6. An expansion sprocket comprising a hub, radially arranged sockets in said hub each having a plurality of transverse recesses in the walls thereof of a depth of a portion of the diameter of a securing device to be received therein, a plurality of teeth each having a shank portion adapted to fit in said sockets and provided with notches of a depth complementing that of the recesses in the walls thereof said recesses and notches being so located with reference to each other as to cause different pairs thereof to register as the shank is moved inwardly and outwardly or rotated in the socket, and a securing member seated in the openings formed by said recesses and notches.

In witness whereof I have hereunto set my hand and seal this 7 day of July 1921.

WALTER C. TROUT. [L. S.]